(12) United States Patent
Leung

(10) Patent No.: US 7,639,770 B2
(45) Date of Patent: Dec. 29, 2009

(54) CYLINDRICAL NEUTRON GENERATOR

(75) Inventor: Ka-Ngo Leung, Hercules, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 12/107,545

(22) Filed: Apr. 22, 2008

(65) Prior Publication Data

US 2009/0262881 A1     Oct. 22, 2009

(51) Int. Cl.
*G21G 1/06* (2006.01)

(52) U.S. Cl. ........................ 376/159; 376/107; 376/108; 376/109; 376/113; 250/492.21; 250/489; 250/518.1

(58) Field of Classification Search .................. None
See application file for complete search history.

(56) References Cited

U.S. PATENT DOCUMENTS

| | | | | |
|---|---|---|---|---|
| 2,907,884 A | * | 10/1959 | Gale | ............................ 376/112 |
| 2,983,434 A | | 5/1961 | Reifel | |
| 2,992,333 A | * | 7/1961 | Gale | ............................ 376/119 |
| 3,014,132 A | * | 12/1961 | Goldie | ........................ 376/116 |
| 3,015,032 A | | 12/1961 | Hoyer et al. | |
| 3,082,326 A | * | 3/1963 | Arnold | ........................ 376/116 |
| 3,113,213 A | | 12/1963 | Brinkerhoff et al. | |
| 3,258,402 A | | 6/1966 | Farnsworth | |
| 3,405,275 A | * | 10/1968 | Bergan | ........................ 376/113 |
| 3,417,245 A | | 12/1968 | Schmidt | |
| 3,609,369 A | * | 9/1971 | Croitoru | ..................... 376/108 |
| 3,751,668 A | | 8/1973 | Coleman et al. | |
| 3,924,138 A | * | 12/1975 | Hopkinson | .................. 376/111 |
| 3,976,888 A | | 8/1976 | Miller et al. | |
| 4,076,990 A | | 2/1978 | Hendry et al. | |
| 4,292,592 A | * | 9/1981 | Birdwell et al. | ............. 315/500 |
| 4,529,571 A | | 7/1985 | Bacon et al. | |
| 4,568,509 A | | 2/1986 | Cvijanovich et al. | |
| 4,829,191 A | | 5/1989 | Boyar et al. | |
| 5,080,856 A | | 1/1992 | Grenier et al. | |
| 5,135,704 A | | 8/1992 | Shefer et al. | |
| 5,215,703 A | * | 6/1993 | Bernardet | ................... 376/114 |

(Continued)

OTHER PUBLICATIONS

"Encyclopedia of Applied Physics", vol. 14, Physics and Technology of Ion and Electron Sources, VCH Publishers, Inc. 1996.*

(Continued)

*Primary Examiner*—Jack W. Keith
*Assistant Examiner*—Vadim Dudnikov
(74) *Attorney, Agent, or Firm*—Fulbright & Jaworski LLP

(57) ABSTRACT

A cylindrical neutron generator is formed with a coaxial RF-driven plasma ion source and target. A deuterium (or deuterium and tritium) plasma is produced by RF excitation in a cylindrical plasma ion generator using an RF antenna. A cylindrical neutron generating target is coaxial with the ion generator, separated by plasma and extraction electrodes which contain many slots. The plasma generator emanates ions radially over 360° and the cylindrical target is thus irradiated by ions over its entire circumference. The plasma generator and target may be as long as desired. The plasma generator may be in the center and the neutron target on the outside, or the plasma generator may be on the outside and the target on the inside. In a nested configuration, several concentric targets and plasma generating regions are nested to increase the neutron flux.

10 Claims, 13 Drawing Sheets

U.S. PATENT DOCUMENTS 6,907,097 B2    6/2005    Leung
6,925,137 B1    8/2005    Forman

OTHER PUBLICATIONS

"The Physics and Technology of Ion Sources", Ian Brown, Wiley-VCH, 2004.*

Lomer, P.D.; Bounden, J.E.; Wood, J.D.L.H., "High Output Neutron Generating Tubes", CONF-650405-2, Services Electronics Rsrch Lab (Baldlock, England), p. 623-34 (Sep. 1, 1964).

Eyrich, W.; Schmidt, A., "Two Compact, High-Density Pulsed Neutron Sources", Technical Report No. KFK-304; SM-62/4, Federal Republic of Germany(Germany), p. 589-608, (May 1, 1965).

Lomer, P.D.; Bounden, J.E.; Wood, J.D.L.H., "A Neutron Tube with Constant Output", Nucl. Instr. Methods,Services Electronics Resrch Lab (Baldlock, England), p. 283-288,(Mar. 1, 1965).

* cited by examiner

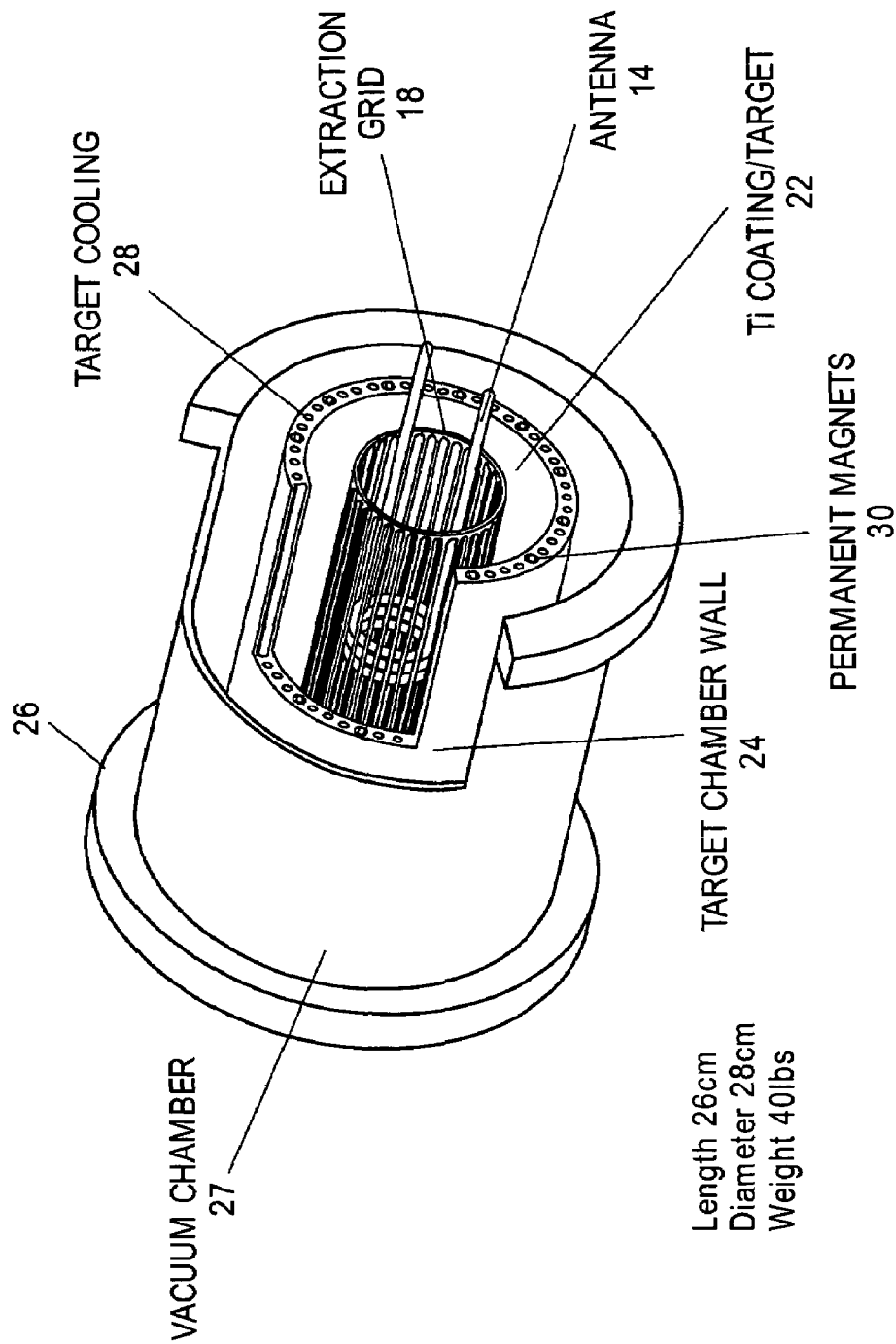

D + D → He + n
(2.45 MeV)

D + T → He + n
(14.1 MeV)

low energy deuteron accelerator ~ 100...200 keV

CYLINDRICAL NEUTRON GENERATOR

GOVERNMENT RIGHTS

The United States Government has rights in this invention pursuant to Contract No. DE-AC03-76SF00098 between the United States Department of Energy and the University of California.

RELATED APPLICATIONS

This application claims benefit of earlier filing date of pending U.S. patent application Ser. No. 11/110,310 filed Apr. 19, 2005, entitled "CYLINDRICAL NEUTRON GENERATOR," hereby incorporated by reference, which in turn claims benefit of earlier filing date of U.S. patent application Ser. No. 10/100,962 filed Mar. 18, 2002, also entitled "CYLINDRICAL NEUTRON GENERATOR," hereby incorporated by reference, which in turn claims benefit of earlier filing date of Provisional Applications Ser. Nos. 60/276,669 filed Mar. 16, 2001 and 60/316,792 filed Aug. 31, 2001, also incorporated by reference.

BACKGROUND OF THE INVENTION

The invention relates to neutron tubes or sources, and more particularly to neutron tubes or sources based on plasma ion generators, including compact neutron tubes or sources which generate a relatively high neutron flux using the D-D reaction.

Conventional neutron tubes employ a Penning ion source and a single gap extractor. The target is a deuterium or tritium chemical embedded in a molybdenum or tungsten substrate. Neutron yield is limited by the ion source performance and beam size. The production of neutrons is limited by the beam current and power deposition on the target. In the conventional neutron tube, the extraction aperture and the target are limited to small areas, and so is the neutron output flux.

Commercial neutron tubes have used the impact of deuterium on tritium (D-T) for neutron production. The deuterium-on-deuterium (D-D) reaction, with a cross section for production a hundred times lower, has not been able to provide the necessary neutron flux. It would be highly desirable and advantageous to make high flux D-D neutron sources feasible. This will greatly increase the lifetime of the neutron generator, which is unsatisfactory at present. For field applications, it would greatly reduce transport and operational safety concerns. For applications such as mine detection, where thermal neutrons are presently used, the use of the lower energy D-D neutrons (2.45 MeV rather than 14.1 MeV) also would decrease the size of the neutron moderator.

The present invention has three potential competitors for field or small-laboratory use: (1) isotopic sources based on a sample of a radioactive substance, e.g. californium-252, that emits neutrons; (2) accelerator sources, usually based on an ion source feeding a radiofrequency quadrupole (RFQ) linac and thence a neutron production target; and (3) conventional neutron tubes. Of these, the most direct and significant competitors are commercially available neutron tubes. As for the others, RFQ-based sources have never become a major commercial presence due to cost and complexity, and the safety concerns and lack of time structure that are inherent to isotopic sources limit their applications.

Neutronics can identify possible explosives and nuclear materials by their composition, not just by their shape or density the way x-ray machines do. Since the September 11 terrorist attacks, detection of explosives and fissionable materials has become an urgent national need. Detecting such materials hidden in baggage or cargo is challenging under real-world conditions. Thermal neutron analysis (TNA) has been tried for inspection of checked baggage and cargo at airports. Low-energy neutrons cause nitrogen in explosives to emit gamma rays and cause fissile materials to give off neutrons of their own. The first-generation TNA screeners were too large, complex, and expensive; FAA-approved screening devices presently on the market use x-rays to look at shapes and densities, rather than using neutronics to detect actual composition.

Besides the obvious considerations of cost-effectiveness and acceptable footprint, systems for inspecting baggage and cargo must offer trustworthiness (reliability combined with freedom from both false positives and false negatives), plus high throughput so that spot checks can be replaced by comprehensive inspection without bottlenecking an already heavily burdened process. Systems are also needed for relatively nonintrusive inspection of larger objects, e.g. an intermodal cargo container, or a vehicle. Detection of land mines or unexploded ordnance is another related application of great worldwide importance. A compact neutron generator design with a high neutron flux and adapted for these uses would be highly advantageous.

Neutron logging instruments consist of a neutron generator and gamma-ray detector packaged so as to fit into a small (e.g. 2-inch-diameter) borehole. Analyzing the gamma ray spectrum due to neutron capture and inelastic scattering in the subsurface allows elements in the medium to be identified. Applications include oil and mineral exploration, and basic geological studies. A neutron generator design with a high neutron flux and adapted for use in a borehole would be highly advantageous.

SUMMARY OF THE INVENTION

The invention is a cylindrical neutron generator formed with a coaxial RF-driven plasma ion source. A deuterium plasma (or a deuterium and tritium plasma) is produced by RF excitation in a plasma ion generator using an RF antenna. A cylindrical neutron generating target is coaxial with the ion generator and is separated therefrom by plasma and extraction electrodes which contain many slots. The plasma generator emanates ions radially over 360° and the cylindrical target is thus irradiated by ions over its entire circumference. The plasma generator and target may be as long as desired.

There are two alternate basic embodiments of the neutron generator, in which the position of the plasma generator and neutron target are reversed. In one embodiment the plasma generator is in the center and the neutron target is on the outside, and in the second embodiment, the plasma generator is on the outside and the target is on the inside. The plasma generator may be either cylindrical or annular shaped, and the target is a cylinder. The neutron target surrounds the cylindrical plasma ion generator or is positioned inside the annular shaped plasma ion generator. In both cases the plasma generator and target are coaxial or concentric. The embodiment with the target on the outside is preferred since the target area is larger.

A more complex embodiment of the neutron generator, which combines the two basic embodiments, has a nested configuration that is formed by nesting concentric targets and plasma regions. The nested configuration places a coaxial target both inside and outside the plasma generating region, and nests several targets and plasma generating regions to increase the neutron flux.

This invention enables the generator to operate with high current density, high atomic species and practically unlimited beam size in the axial or longitudinal direction. The structure is compact and rugged, e.g. the RF antenna can form part of the plasma electrode and chamber wall. Thus the source's lifetime should be greatly increased because no weak components exist. The geometry is ideal for borehole applications. The source is ideal for many neutronic applications. Because of the increased target area, the much safer D-D reaction can be used, eliminating any tritium from the source.

DETAILED DESCRIPTION OF THE INVENTION

Figure 1A:
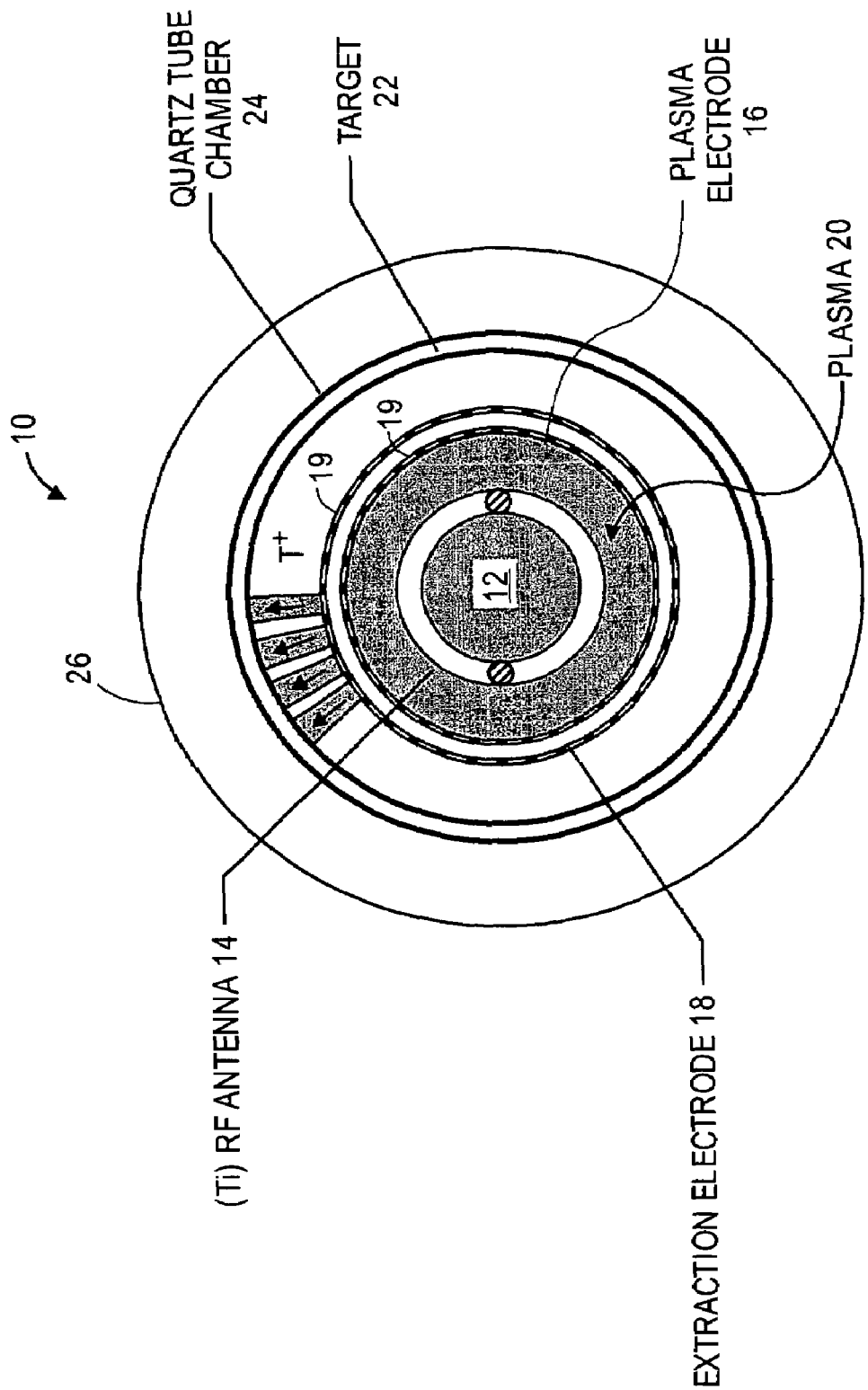
FIGS. 1A, B are radial cross sections of two alternate basic embodiments of the cylindrical neutron generator of the invention, with the coaxial target on the outside and inside, respectively.
Figure 1B:
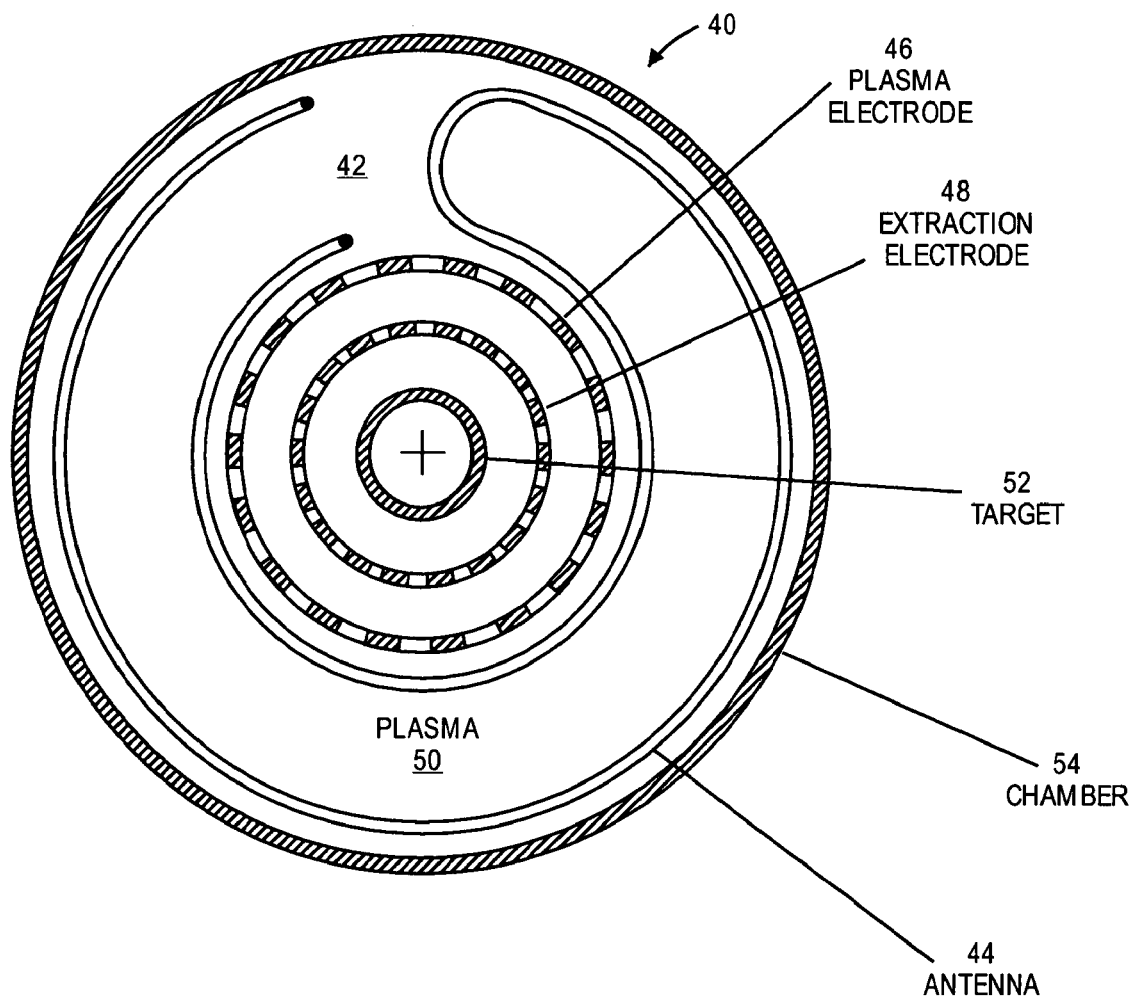
Figure 2A:
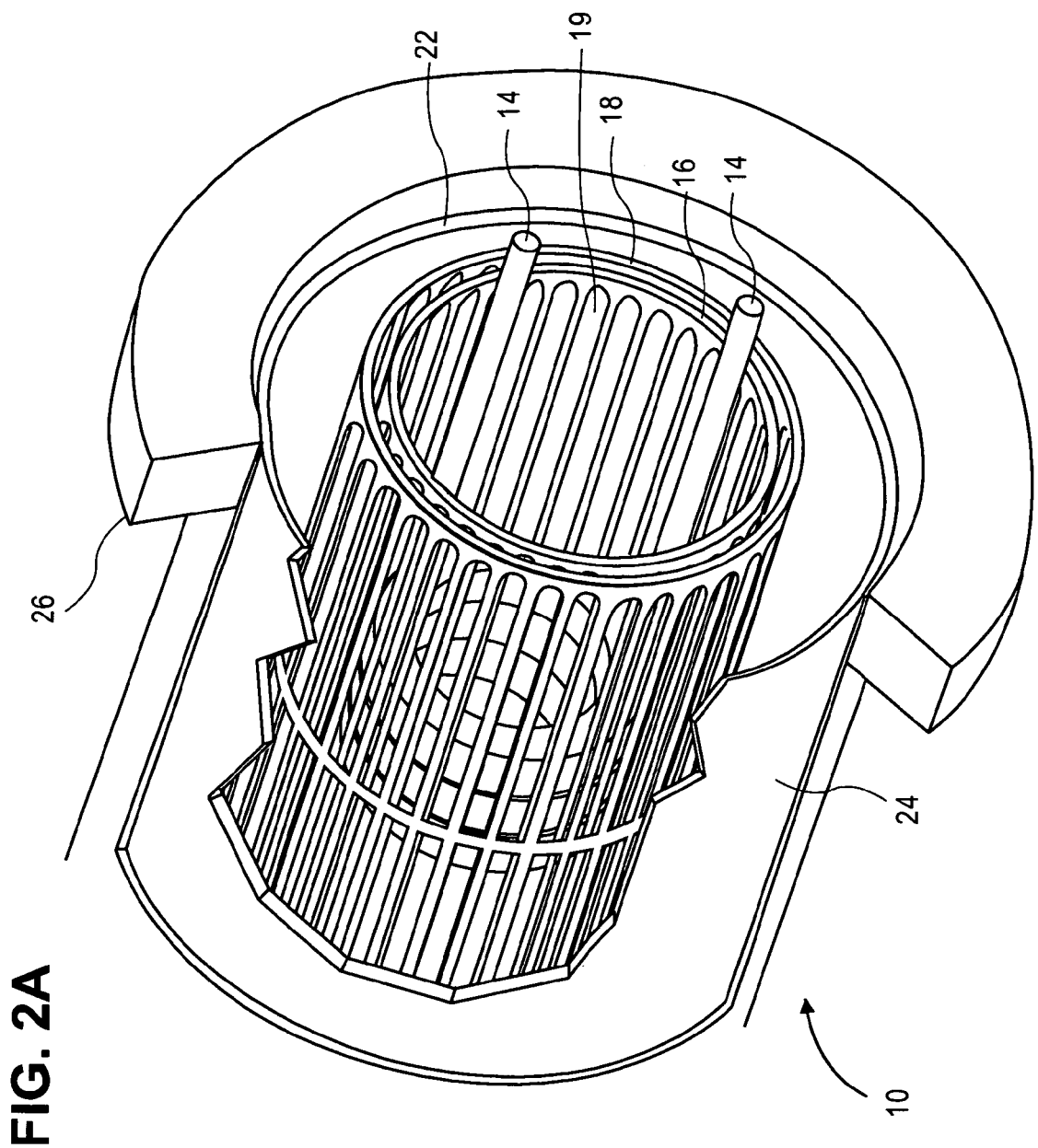
FIGS. 2A, B are perspective views, partly in section, of the two alternate basic embodiments of the invention.

FIGS. 1A, 2A, 3A show the neutron source geometry of a first embodiment 10 of the invention, which has a cylindrical neutron generating target outside a cylindrical plasma ion source. Neutron generator 10 has a cylindrical plasma ion source 12 at its center. The principles of plasma ion sources are well known in the art. Conventional multicusp ion sources are illustrated by U.S. Pat. Nos. 4,793,961; 4,447,732; 5,198,677; 6,094,012, which are herein incorporated by reference.

Ion source 12 includes an RF antenna (induction coil) 14 for producing an ion plasma 20 from a gas which is introduced into ion source 12. Antenna 14 is typically made of titanium tubing, which may be water cooled. For neutron generation the plasma is preferably a deuterium ion plasma but may also be a deuterium and tritium plasma. A deuterium plasma with current density of about 100 mA/cm$^2$ can be produced. Ion source 12 also includes a pair of spaced electrodes, plasma electrode 16 and extraction electrode 18, along its outer circumference. Electrodes 16, 18 electrostatically control the passage of ions from plasma 20 out of ion source 12. Electrodes 16, 18 contain many longitudinal slots 19 along their circumferences so that ions radiate out in a full 360° radial pattern.

Coaxially or concentrically surrounding ion source 12 and spaced therefrom is cylindrical target 22. Target 22 is the neutron generating element. Ions from plasma source 12 pass through slots 19 in electrodes 16, 18 and impinge on target 22, typically with energy of 120 keV to 150 keV, producing neutrons as the result of ion induced reactions. The target 22 is loaded with D (or D/T) atoms by the beam. Titanium is not required, but is preferred for target 22 since it improves the absorption of these atoms. Target 22 may be a titanium shell or a titanium coating on another chamber wall 24, e.g. a quartz tube. Flange 26 extends from the ends of chamber wall 24.

The extraction apertures in electrodes 16, 18 are in the form of slots 19 whose length can be extended to any desired value. The beam impinges on the target 22 in 360.degree. and therefore the target area can be enhanced by at least 2 orders of magnitude over conventional neutron sources. Thus the same or greater neutron flux can be generated from D-D reactions in this neutron generator as can be generated by D-T reactions in a conventional neutron tube, eliminating the need for radioactive tritium. The neutrons produced, 2.45 MeV for D-D or 14.1 MeV for D-T, will also go out radially in 360°. By making the neutron generator as long as practical in the axial or longitudinal direction, a high neutron current can be obtained.

FIG. 2A shows further details of neutron generator embodiment 10 from FIG. 1A. Induction coil (RF antenna) 14 is positioned inside concentric cylindrical electrodes 16, 18. Ions passing through the slots 19 in electrodes 16, 18 strike target (surface) 22.

FIG. 3A shows some further details and minor variations of the design. The entire generator 10 is contained within a vacuum chamber 27 which is spaced apart from target chamber wall 24. Only a single extraction grid 18 is shown; plasma grid 16 is not needed since the ions can be extracted with a single grid. Chamber wall 24, on which target coating 22 is formed, is surrounded by target cooling coils 28. Permanent magnets 30 are arranged in a spaced apart relationship, running longitudinally along plasma ion generator 12, to from a magnetic cusp plasma ion source. The principles of magnetic cusp plasma ion sources are well known in the art, as cited above.

FIGS. 1B, 2B, 3B, 3C show the neutron source geometry of a second embodiment 40 of the invention, which is similar to neutron generator 10, except that the cylindrical ion source and neutron generating target are in a reversed position, i.e. the cylindrical neutron generating target is inside the cylindrical plasma ion source. Neutron generator 40 has a cylindrical plasma ion source 42 at its outside. Ion source 42 includes an RF antenna (induction coil) 44 for producing an ion plasma 50. Ion source 42 also includes a pair of spaced electrodes, plasma electrode 46 and extraction electrode 48, along its inner circumference. Electrodes 46, 48 electrostatically control the passage of ions from plasma 50 out of ion source 42 into the interior of neutron generator 40. Electrodes 46, 48 contain many longitudinal slots 49 along their circumferences so that ions radiate in a full 360° radial pattern. Extraction electrode 48 is inside plasma electrode 46, the reverse of neutron generator 10, since the direction of plasma flow from the plasma ion source 42 is radially inward rather than radially outward, as in neutron generator 10.

Ion source 42 coaxially or concentrically surrounds and is spaced from an inner cylindrical target 52. Target 52 is the neutron generating element. Ions from plasma source 42 pass through slots 49 in electrodes 46, 48 and impinge on target 52, typically with energy of 120 keV to 150 keV, producing neutrons as the result of ion induced reactions. The target 52 is loaded with D (or D/T) atoms by the beam. Titanium is not required, but is preferred for target 52 since it improves the absorption of these atoms. Neutron generator 40 is enclosed in an external chamber 54.

The extraction apertures in electrodes 46, 48 are in the form of slots 49 whose length can be extended to any desired value. The beam impinges on the target 52 in 360° and therefore the target area can be enhanced. However, between neutron sources 10 and 40, for the same outside source diameter, the target in source 10 will be larger because of its larger diameter. The neutrons produced, 2.45 MeV for D-D or 14.1 MeV for D-T, will also go out radially in 360°. By making the neutron generator as long as practical in the axial or longitudinal direction, a high neutron current can be obtained.

Figure 2B:
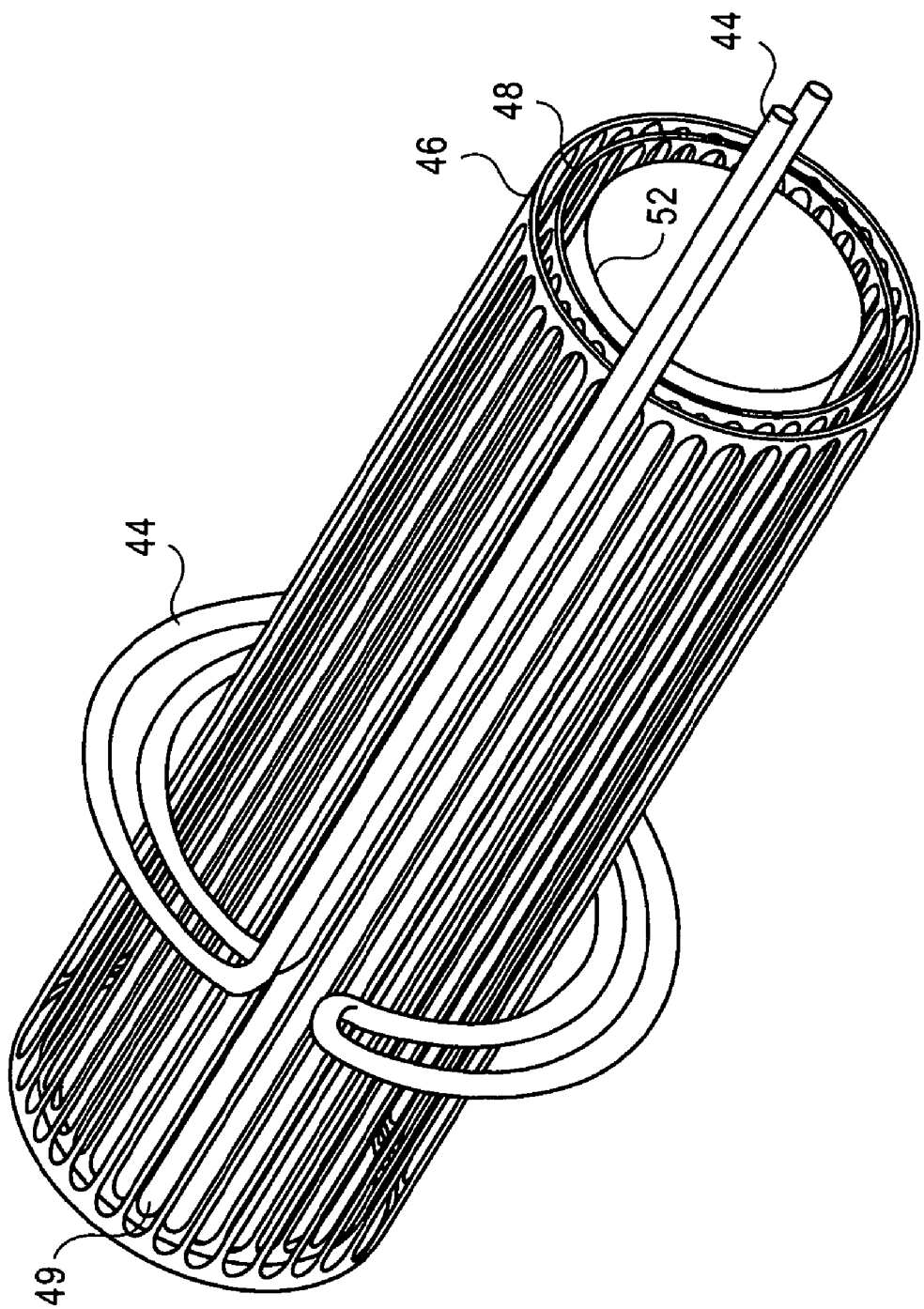
Figure 3B:
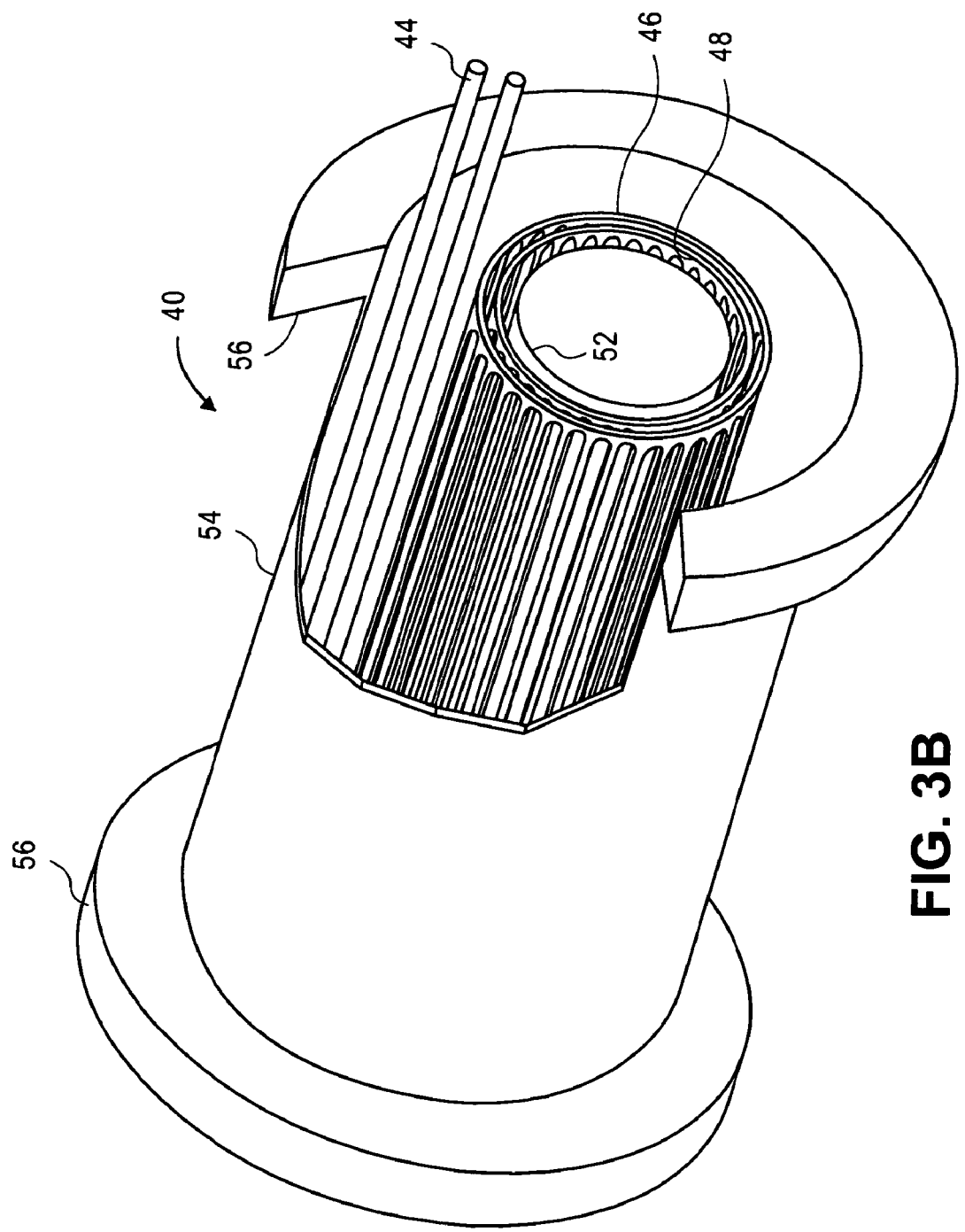
FIGS. 3A, B, C are further perspective views, partly in section, of the two alternate basic embodiments of the invention.
Figure 3C:
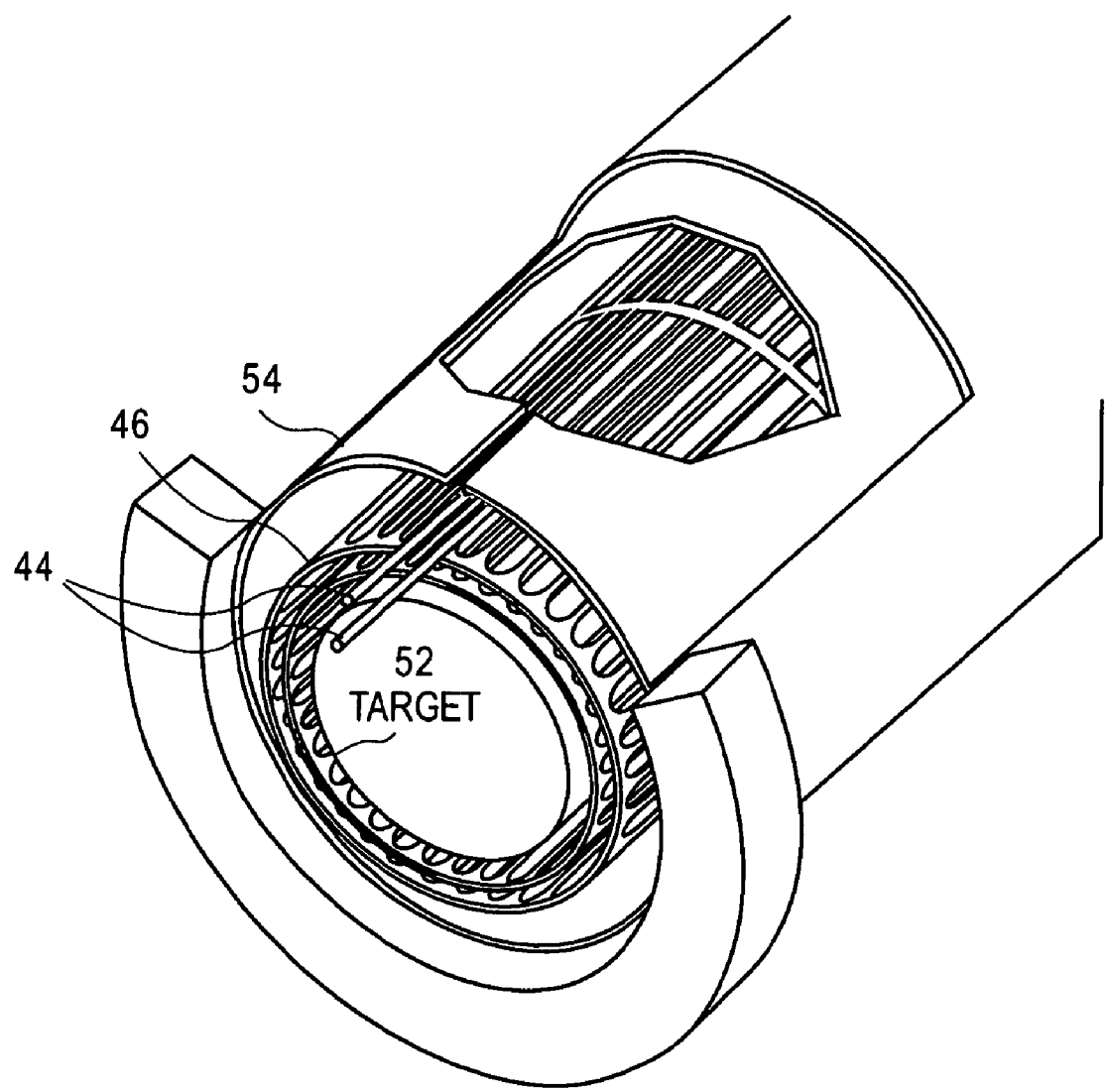

FIG. 2B shows the internal structure of neutron source 40 without chamber 54, and FIG. 3B shows the structure of FIG. 2B inside chamber 54, with flanges 56 extending from the ends of chamber 54. FIG. 3C shows a minor design change in which the RF antenna 44 is incorporated into the plasma electrode 46 and the chamber wall 54. This arrangement makes the source more compact and efficient.

Figure 4A:
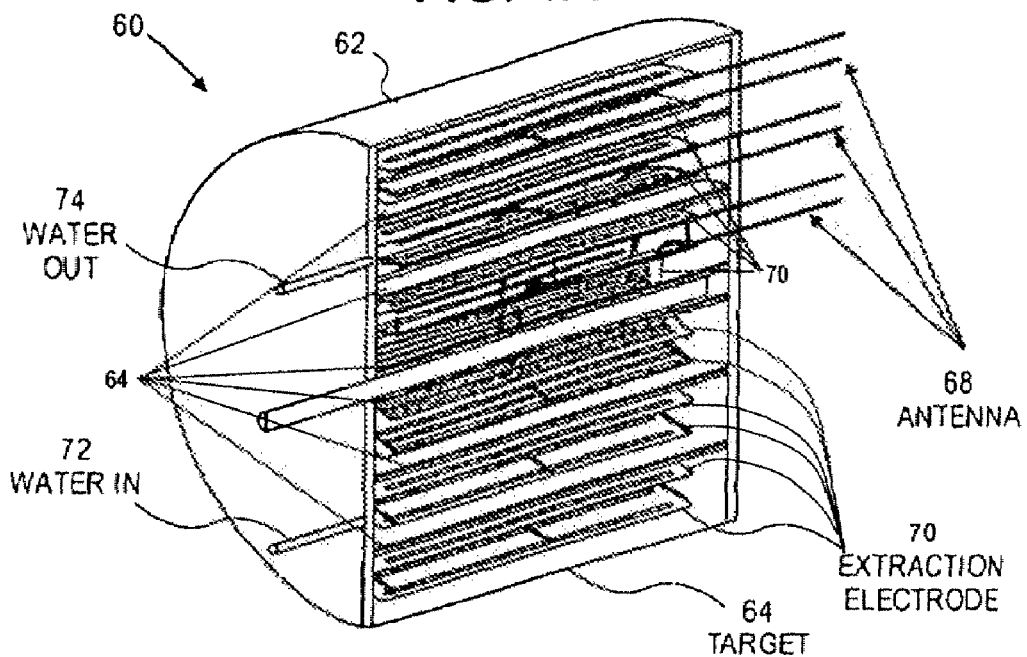
FIGS. 4A, B are a perspective view, partly in section, and a radial cross section of a nested coaxial neutron source of the invention.
Figure 4B:
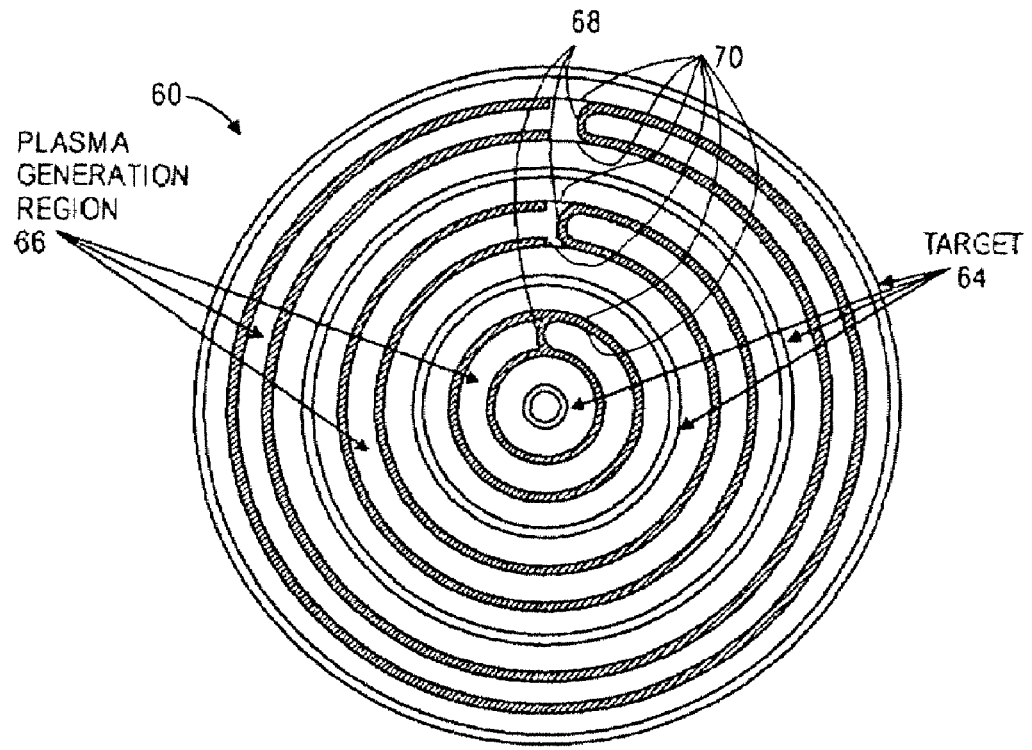
FIGS. 4C, D are radial and axial cross sections of the nested neutron source showing the alternating targets and plasma generating regions with cooling system.
FIGS. 4E, F are radial and axial cross sections of the nested neutron source showing the alternating targets and plasma generating regions with the RF antennas.

FIGS. 4A-B show the neutron source geometry of a third embodiment 60 of the invention, which has a nested configuration that is formed by nesting concentric neutron generating targets and plasma generating regions. The nested configuration of source 60 is a combination of sources 10, 40, placing a coaxial target both inside and outside a plasma generating region, and nesting several targets and plasma generating regions to increase the neutron flux. Except for the additional number of each component, each one is structured and functions essentially the same as in the basic embodiments.

Inside a cylindrical chamber 62, a plurality of concentric or coaxial alternating targets 64 and plasma generating regions 66 are arranged. Each target 64 is a cylinder. Each plasma generating region 66 is annular and has an RF antenna (induction coil) 68 positioned therein. While four targets 64 alternating with three plasma generating regions 66 are shown, at least one plasma generating region 66 with two targets 64 are needed and any number of additional nested layers may be added depending on the desired neutron yield. Each plasma generating region 66 is bounded by extraction electrodes 70 on both its inner and outer surfaces. Extraction electrodes 70 contain longitudinal slots, as previously shown, through which ions are extracted from plasma generating regions 66 and directed onto targets 64. A deuterium plasma with current density of about 100 mA/cm$^2$ can be produced.

Chamber 60 has a water inlet 72 and water outlet 74 for circulating water or other coolant to remove heat from the targets 64, as described further herein. The targets are typically made of copper with a thin coating of titanium on the surface. The power density generated by the beam is about 600 W/cm$^2$ which can be removed by water cooling.

Figure 4C:
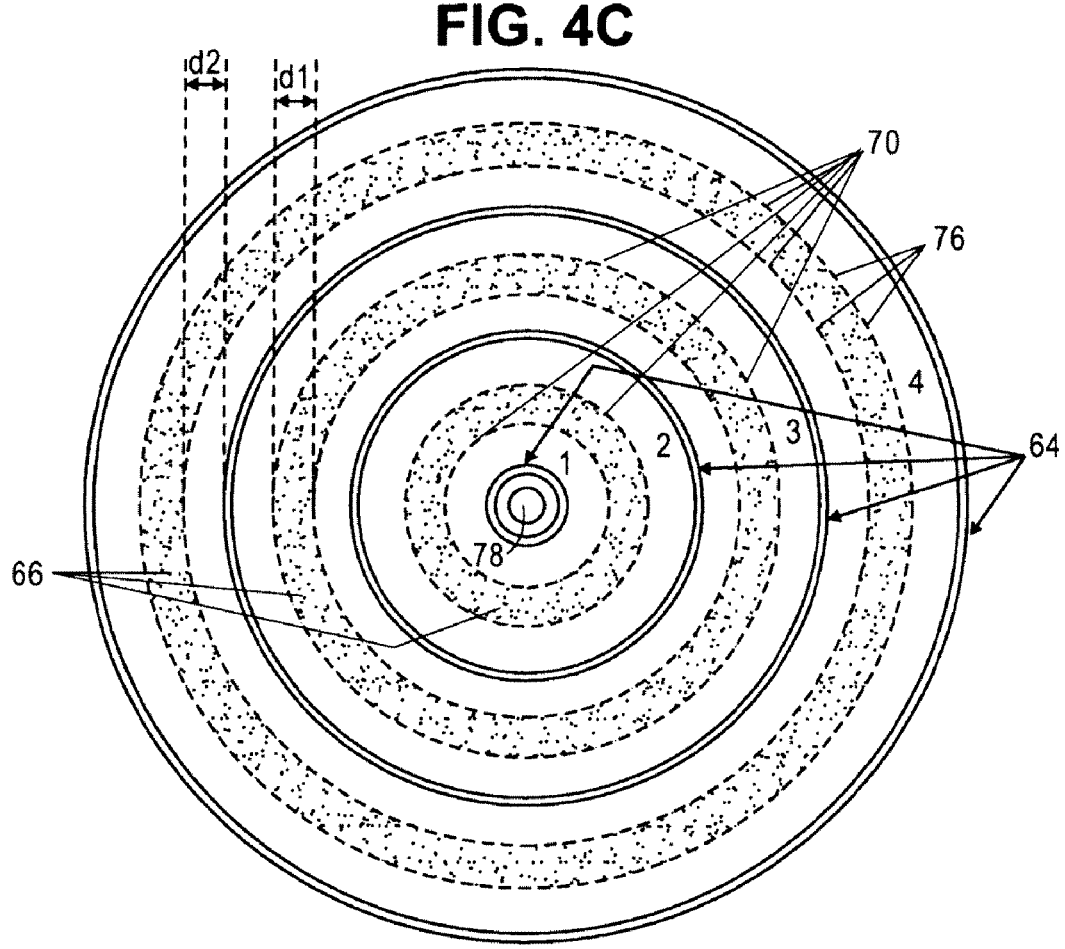
Figure 4D:
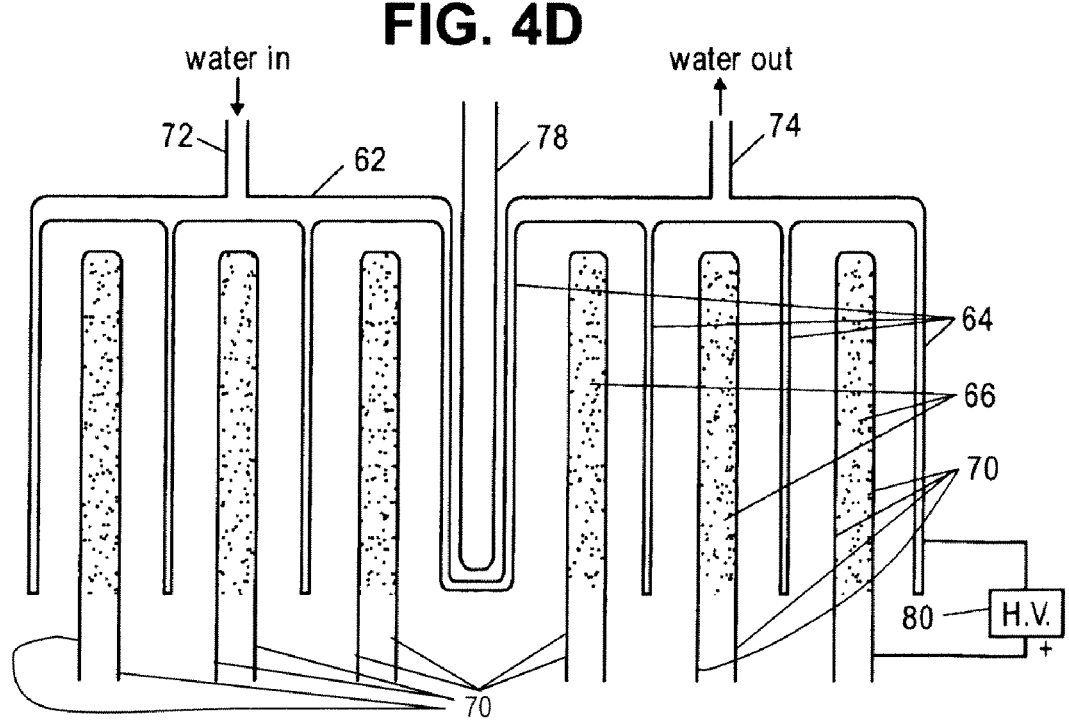

As shown in FIGS. 4C-D, plasma generating regions 66 and targets 64 are nested coaxially. Extraction electrodes 70 with slots 76 bound the regions 66. The width of regions 66 is d1 and the gap from electrode 70 to target 64 is d2; d1 and d2 are typically 2.5 cm. Water inlet 72 and outlet 74 in chamber 62 connect to coolant channels in the chamber wall and targets 64 so that the targets can be cooled by flowing coolant during operation. A rod 78 may extend into the center of the source inside the inner target. Samples may be placed there for irradiation. A high voltage source 80 is connected between the extraction electrodes 70 and targets 64 to extract the ions from regions 66 where they are formed and accelerate them onto the targets 64 where they are collected and react. With a gap of about 2.5 cm, and adequate pumping in the region outside the ion sources, an extraction voltage of 80 kV or higher may be used.

Figure 4E:
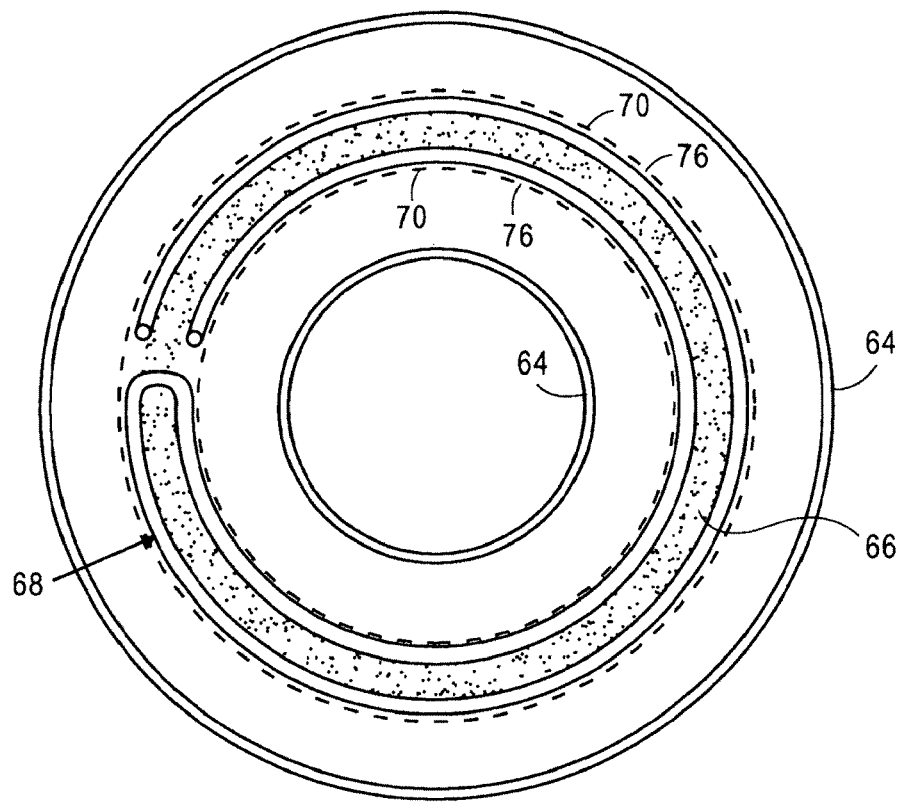
Figure 4F:
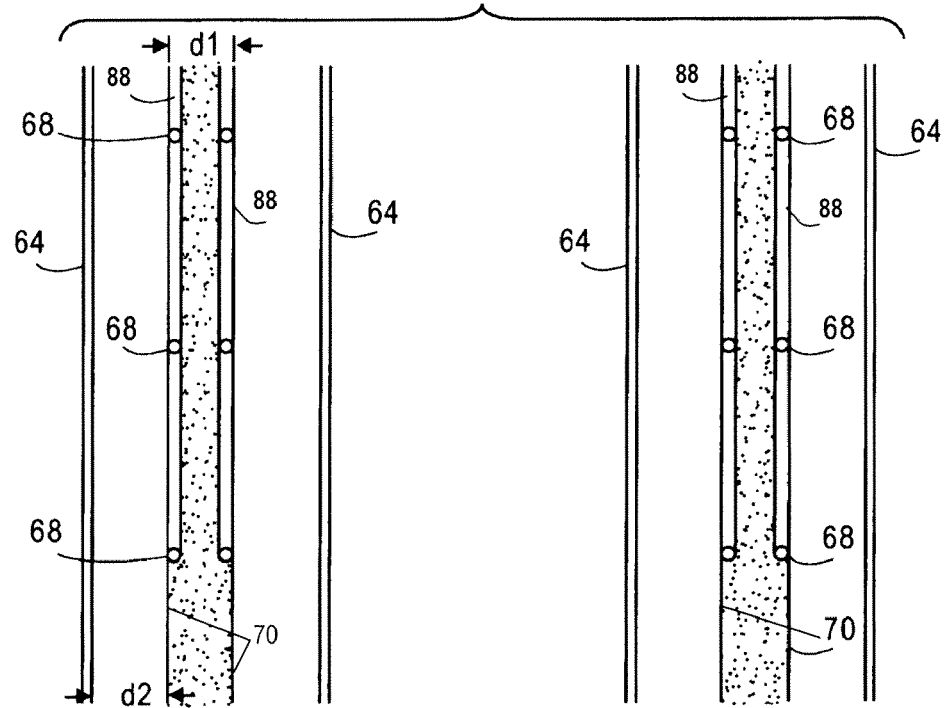

As shown in FIGS. 4E-F, RF antennas 68 are disposed within plasma generating regions 66. As shown in FIG. 4E, a coil of antenna 68 loops around the annular region 66 in a radial plane. As shown in FIG. 4F, a plurality, e.g. three, coils of antenna 68 are spaced apart axially in different radial planes along the length of the source. The separate coils of antenna 68 are all connected together in parallel by linear elements 88 which extend axially along the source. Thus the antenna generally comprises three or more antenna loops with a bi-filar arrangement, normally connected in parallel. The antenna is typically made of titanium tubing, which may be water cooled.

Figure 5:
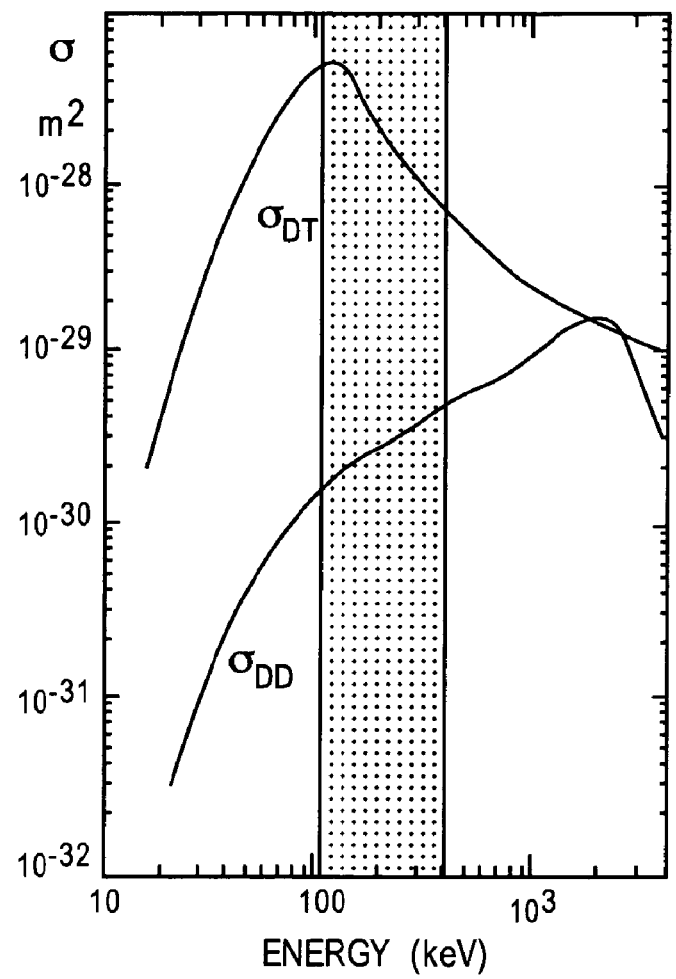
FIG. 5 is a graph of the neutron production cross sections of the D-D and D-T reactions.

FIG. 5 is a graph of the neutron production cross sections of the D-D and D-T reactions. Although the D-D cross section is much lower than the D-T cross section, the large target surface area provided by the cylindrical geometry, makes a source based on the D-D reaction practical since high neutron flux can be obtained. Thus the hazards of dealing with tritium in the source can be eliminated.

Figure 6:
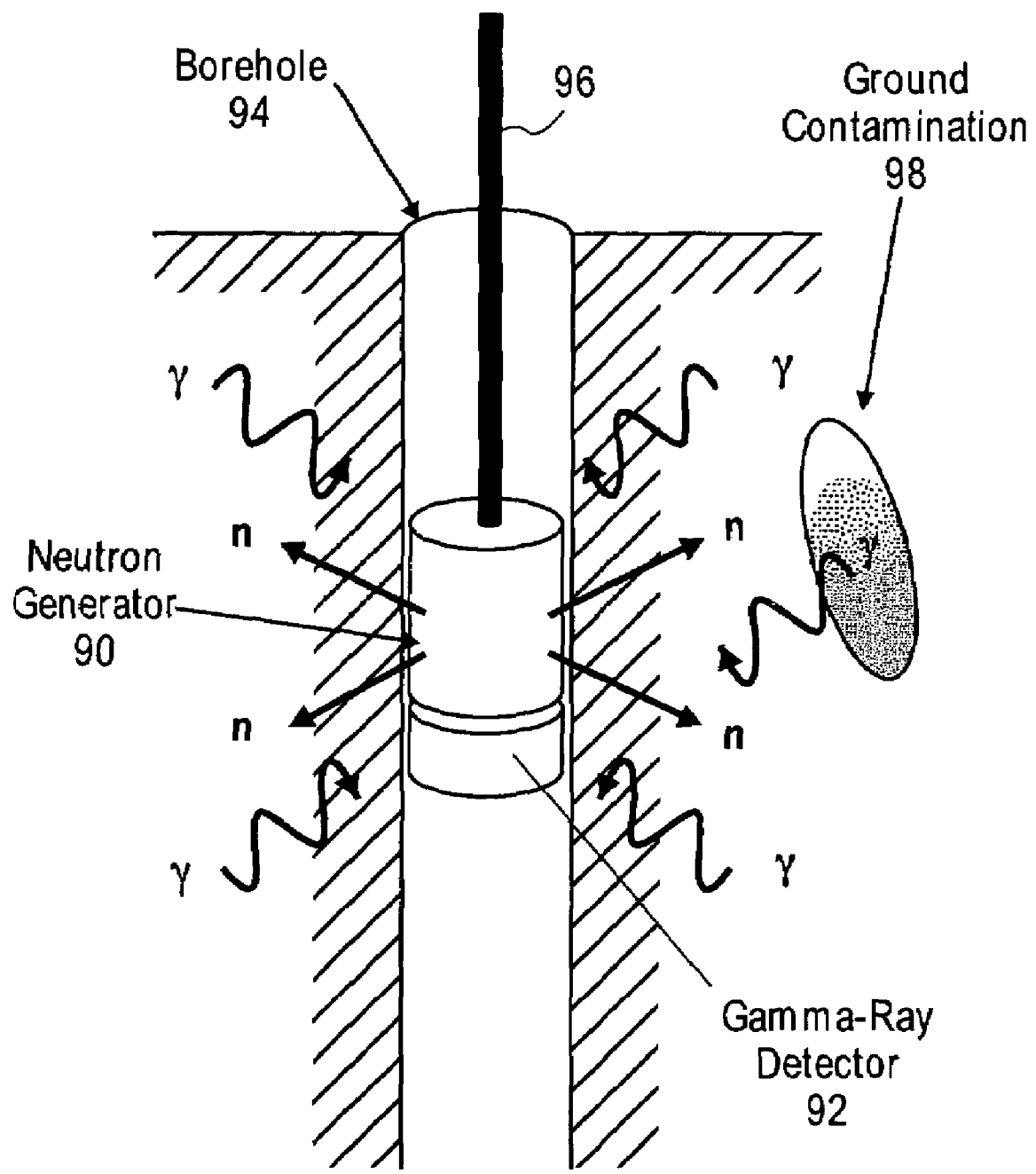
FIG. 6 illustrates the neutron source of the invention positioned in a borehole.

FIG. 6 shows an application of the compact high flux neutron source for borehole instrumentation, e.g. oil well logging. A neutron generator 90 according to the invention, in combination with a gamma ray detector 92, is lowered into a borehole 94, with necessary electrical connections made through cable 96. Neutrons emitted by generator 90 interact with features in the ground, e.g. ground contamination region 98, and produce gamma rays that are detected by detector 92. The signals are analyzed by techniques known in the art to identify subterranean features or the presence of resources. Because of the cylindrical geometry of generator 90, it can be made of a diameter suitable for a typical borehole, while its length can be selected to give a sufficiently high neutron flux to improve detection capability.

The combination of simplicity, compactness, and high flux offered by the compact neutron source of the invention is also advantageous for security applications such as thermal neutron analysis (TNA) to inspect baggage at airports. Compared to other technologies for performing TNA, it is much cheaper and simpler than RFQ-based systems, substantially smaller than previous neutron tubes capable of the same flux (which is important because high neutron flux is allows high throughput), and if D-D reactions are used, not only intrinsically safer than radioactive sources, but also, in contrast to them, capable of being gated rapidly on and off to allow finer discrimination by the detector and accompanying software.

Figure 7:
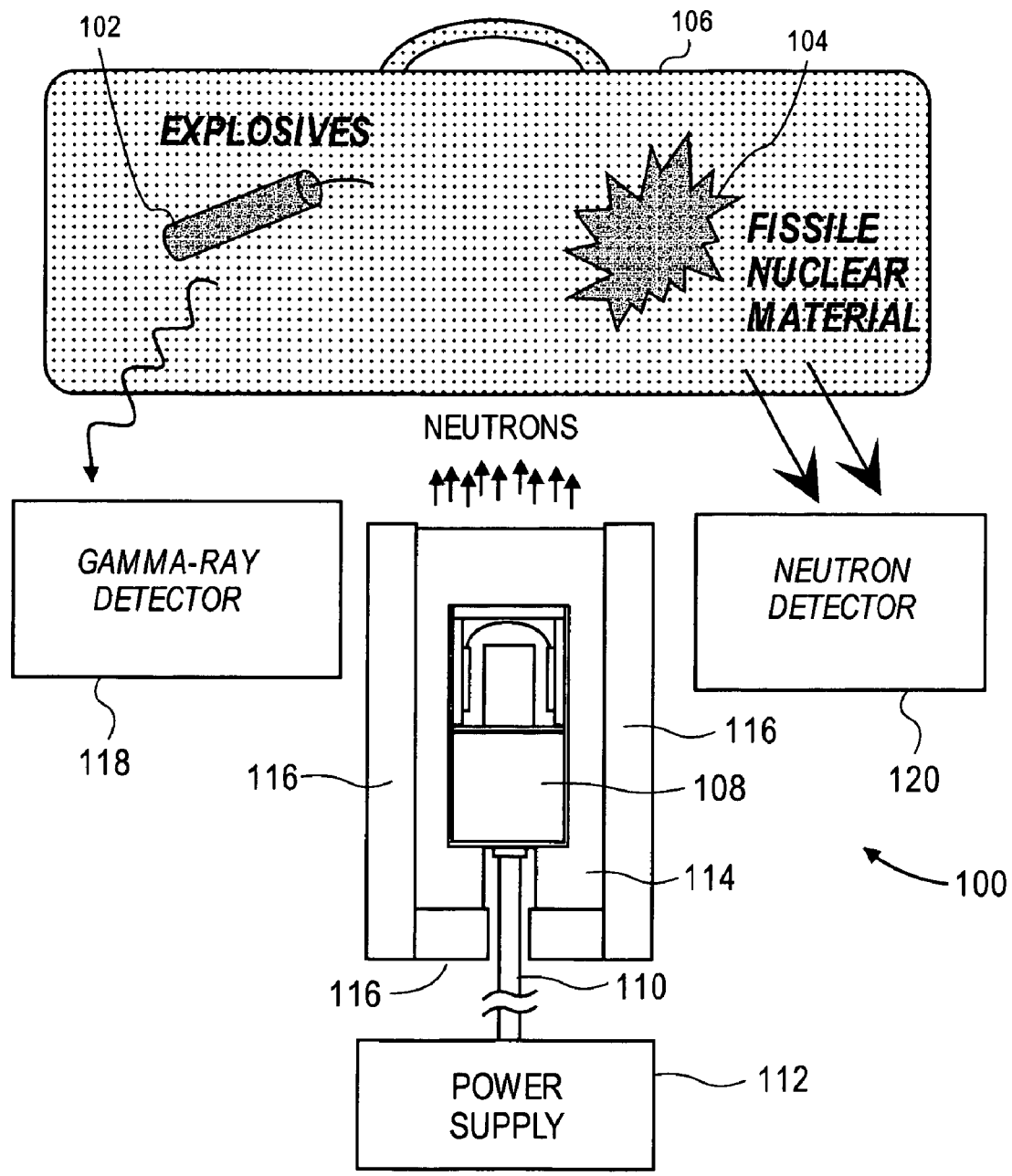
FIG. 7 illustrates the neutron source of the invention in a security system for detecting explosives or fissionable material.

FIG. 7 illustrates a system 100 for detecting explosives 102 or fissile nuclear material 104 in a suitcase 106. System 100 includes a compact neutron source 108 of the type as generally described above but which may be slightly modified to also provide neutrons in an axial direction by extending the target to cover an end of the source and extracting ions axially as well as radially from the plasma generating region. Source 108 is connected by a power cable 110 to an external power supply 112. Source 108 is surrounded by a moderator 114 which slows the neutrons generated by source 108 to thermal energy to perform TNA. The moderator is further surrounded on the sides and back end by shielding 116 which prevents neutrons from escaping, so that all emitted neutrons are emitted from the front end and can be directed to the desired inspection point. Thermal neutrons may be reflected from the shield toward the open end. Also neutron source 108 could be placed transverse to the direction shown. External gamma ray detector 118 is used to detect gamma rays emitted by explosives and external neutron detector 120 is used to detect neutrons from fissile nuclear material.

As described above, the neutron tube with coaxial geometry increases the available target area, thus giving up to 1000× the neutron output of existing tubes of comparable size. Such high output from so small a device opens up new horizons for explosives detection and also for R&D applications of neutronics. In a representative small version of this highly scalable design (length 26 cm, diameter 28 cm, and weight about 18 kg) with a single target, an expected output has been calculated of ~$1.2\times10^{12}$ n/s for D-D neutrons and ~$3.5\times10^{14}$ n/s for D-T. The neutron flux of course depends on several parameters, including voltage, current, and the size of the tube. The ultimate limiting factor in output is the power density on the target, which is conservatively limited at ~650 W/cm$^2$. Tubes with nested concentric targets and plasma regions can have as much as 10× higher average neutron flux than a tube of similar size (e.g. length 35 cm, diameter 48 cm) with a single target, e.g. ~$1.6\times10^{13}$ n/s for D-D neutrons and ~$4.5\times10^{15}$ n/s for D-T. As a broad general principle, "comparable" conventional neutron tubes (e.g., with diameters of several tens of cm and lengths of up to a few hundred cm) produce $10^6$ to $10^8$ neutrons per second in D-D operation.

Many neutronics applications could be improved by a small high-flux neutron source according to the invention. These include:

Condensed matter physics. Scattering of slow neutrons in condensed matter (solids or liquids) can determine structure on the atomic or molecular level. Neutrons penetrate deeply into matter, enabling study of new materials in realistic temperatures, pressures, and other ambient conditions.

Material science. Point defects, dislocations, interphase boundaries, intrinsic junctions with microcracks, pores, etc. can be studied.

Studies of molecular compounds. Small-angle neutron scattering (SANS) is a powerful method to investigate polymer systems and surface-active substances. Specular reflection provides information about the structure along the surface.

Biology. Neutrons can "see" hydrogen better than photons can, so details of the structure and function of some biological systems can be better studied.

Medical applications. Boron neutron-capture therapy trials; brachytherapy.

Engineering analysis. Neutron diffraction probes internal stresses in multiphase materials. Both R&D and nondestructive evaluation could benefit.

Earth sciences. Neutrons can probe the texture of rocks and minerals and the effects of external pressure on the structure of samples.

Changes and modifications in the specifically described embodiments can be carried out without departing from the scope of the invention which is intended to be limited only by the scope of the appended claims.

The invention claimed is:

1. A cylindrical neutron source, comprising: a cylindrical chamber; a plurality of alternatingly nested concentric or coaxial neutron generating targets and plasma ion generating regions, wherein each target is a cylinder and each plasma ion generating region is annular and has an inner and an outer plasma boundary surface; an RF antenna induction coil positioned in each plasma ion generating region; cylindrical extraction electrodes at both the inner and outer boundary surfaces of each plasma ion generating region having a voltage difference applied relative to the adjacent target, the extraction electrodes containing a plurality of longitudinal slots through which the ions are extracted from plasma ion generating regions and directed onto the targets in consequence of the applied voltage.

2. The neutron source of claim 1 wherein the plasma generating regions are deuterium ion sources.

3. The neutron source of claim 2 wherein the targets have titanium surfaces.

4. The neutron source of claim 1 wherein the source has a length of about 35 cm and a diameter of about 50 cm.

5. A cylindrical neutron source, comprising:
a cylindrical chamber;
at least two plasma ion generating regions and at least two neutron generating targets, a first neutron generating target disposed concentrically as a cylinder inside and spaced from a first plasma ion generating region, a second neutron generating target disposed concentrically as a cylinder outside and spaced from said first plasma ion generating region, and a second plasma ion generating region disposed concentrically outside and spaced from said second neutron generating target, all of said plasma generating regions and said neutron generating targets being disposed within said cylindrical chamber;
an RF antenna induction coil disposed within each plasma generating region; and
a plurality of cylindrically shaped extraction electrodes having longitudinal slots, wherein each said plasma ion generating region is annular and has an inner and an outer plasma boundary surface, each of said plasma ion generating regions having a first extraction electrode disposed adjacent said inner plasma boundary surface of said plasma ion generating regions, each of said inner plasma boundary surfaces being disposed in each of said plasma ion generating regions so as to be positioned within a portion of said plasma ion generating region that is located toward a center longitudinal axis of said neutron source, and a second extraction electrode disposed adjacent said outer plasma boundary surface of said plasma ion generating region, each of said outer plasma boundary surfaces being disposed in each of said plasma ion generating regions so as to be positioned within a portion of said plasma ion generating region that is located farther from the center longitudinal axis than is said inner plasma boundary surface, and each said first and second extraction electrodes having a voltage difference applied relative to the adjacent target.

6. The cylindrical neutron source of claim 5 wherein the plasma generating regions are deuterium ion sources.

7. The cylindrical neutron source of claim 6 wherein the targets have titanium surfaces.

8. The cylindrical neutron source of claim 5 wherein the source has a length of about 35 cm and a diameter of about 50 cm.

9. The cylindrical neutron source of claim 5 further comprising a plurality of coaxially nested alternating ion sources and targets.

10. The cylinder neutron source of claim 5, wherein each plasma generating region forms an unintermittent plasma.

\* \* \* \* \*